J. E. THOMPSON.
DISK SHARPENER.
APPLICATION FILED JULY 28, 1917.
1,262,869.
Patented Apr. 16, 1918.
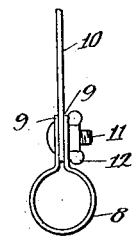
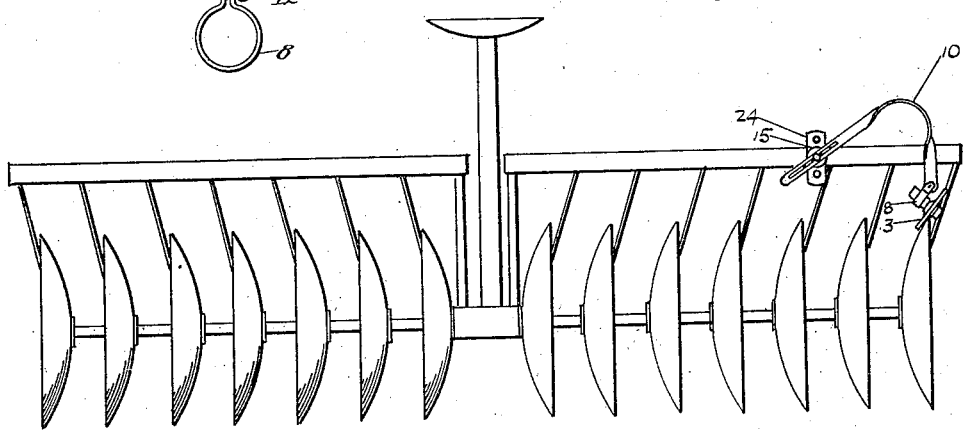
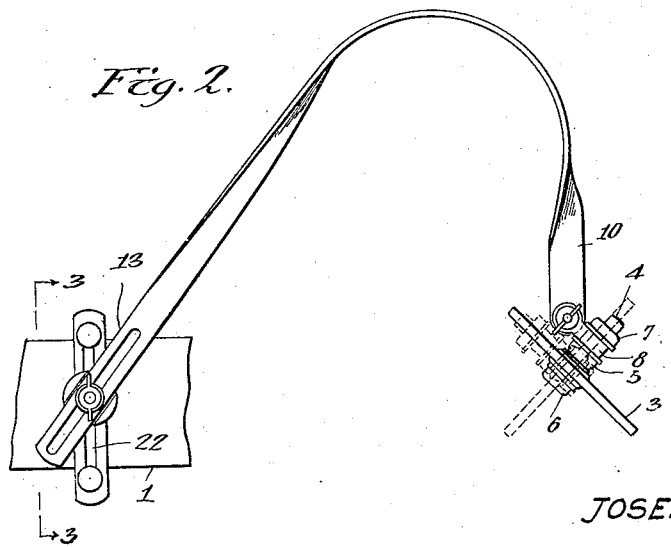
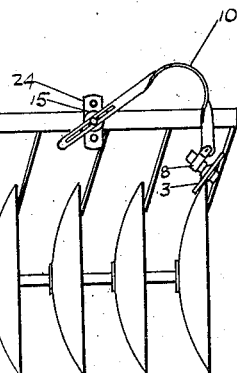
INVENTOR
JOSEPH E THOMPSON
BY M. S. Baberele
ATTY.

UNITED STATES PATENT OFFICE.

JOSEPH E. THOMPSON, OF KAGAWONG, ONTARIO, CANADA.

DISK-SHARPENER.

1,262,869. Specification of Letters Patent. Patented Apr. 16, 1918.

Application filed July 28, 1917. Serial No. 183,214.

*To all whom it may concern:*

Be it known that I, JOSEPH E. THOMPSON, a subject of the King of Great Britain, residing at Kagawong, Ontario, Canada, have invented new and useful Improvements in Disk-Sharpeners, of which the following is a specification.

The invention to be hereinafter described relates to disk sharpeners.

In order to more clearly disclose the construction, operation, and use, of the invention, reference should be had to the accompanying drawings forming part of the present application. Throughout the several figures of the drawings, like reference characters designate the same parts.

In the drawings:—

Figure 1 is a rear view of a disk harrow, with the invention applied;

Fig. 2 is an enlarged rear elevation of the sharpener, detached;

Fig. 3 is a cross section on the line 3—3 of Fig. 2, looking in the direction of the arrows, and Fig. 4 is an enlarged detail of the collar.

The main objects of the invention are to provide a simple, efficient, compact, durable, economical, and readily manufactured disk sharpening device which may be quickly and easily attached to or detached from a disk harrow frame, and adjusted thereon, and which may be used equally on disks of either type—in-throw or out-throw.

Referring to the drawings in detail, 1 indicates the top beam or frame member of a disk harrow, and 2 the disks. For sharpening the disks, a stone or plate 3 is provided and held continually in engagement with the edge of the disk. Through the center of the stone is passed a small spindle 4, nuts 5 and 6 being threaded on the spindle to secure the stone in place thereon, between them, suitable washers being interposed. About the spindle 4 and between nut 5 and a nut 7, threaded thereon, is a split sleeve 8, allowing free revolution of the spindle therein. Suitable washers are interposed between the ends of the sleeve and the nuts 5 and 7. From sleeve 8, extend parallel perforated ears 9, by which the sleeve is detachably and adjustably connected to the outer end of a curved spring arm 10. The connection is by means of a bolt 11 passed through the perforations of the ears and a hole in the end of arm 10. A thumb screw 12 threaded on bolt 11 completes the connection and acts, also, as a pivot on which sleeve 8 swings to bring the stone into the exact position desired. Then, by tightening the thumb nut 12, the sleeve is securely and solidly clamped in adjusted position so that the stone or plate will remain at the right angle. The opposite end of the arm 10 is provided with a longitudinal slot 13 and slides in a channel 14 in a nut 15 which coöperates with a nut 16 having a channel 17 adapted to receive a bar 18. The two nuts are provided with coöperating ribbed or corrugated faces 19 and 20. A bolt 21 passes through the nuts 15 and 16 and plays in slot 13 and a longitudinal slot 22 of bar 18. By such a construction, the spring arm 10 may be swung around the bolt 21, as a pivot, or slid diagonally up or down, relatively to bolt 21, or slid vertically up or down with bolt 21. By means of a thumb nut 23, turned down on bolt 21, the arm 10 is clamped securely in its channel, nut 16 is clamped securely about bar 18, and nuts 15 and 16 are securely locked together. This holds arm 10 securely in its adjusted position, against any possible shift in any direction. A second bar 24, similar to bar 18 and provided with a similar slot 25, coöperates with bar 18 to form a clamp for securing the sharpener in operative position. To complete the clamp, bolts 26 and thumb nuts 27 are used. Bars 18 and 24 are long enough to accommodate the widest frame member 1 and bolts 26 are long enough to accommodate the thickest frame member. Thus they may be quickly applied to any frame member desired, and securely clamped thereon, by means of the thumb nuts 27. In this clamping operation, the head of bolt 21 will be forced into or embedded in the wood of the frame member 1 as clearly shown in Fig. 3.

By means of the pivot bolt 11, the stone 3 may be swung from the full line to the dotted line position of Fig. 2, adapting it for use on either in-throw or out-throw disks, as desired.

Thus, a sharpener of this construction and arrangement may be almost instantaneously adapted and adjusted to any of the ordinary makes of disk harrows.

It is thought that the construction, operation, and use of the invention, will be clear from the preceding detailed description. Changes may be made in the construction, arrangement, and disposition of the several parts of the invention, without departing from the field and scope of the same and it is meant to include all such within this application, wherein only a preferred form has been disclosed by way of illustration.

Having thus described my invention, what I claim and desire to protect by Letters Patent is:—

1. A supporting arm provided with a longitudinal slot and carrying a disk-sharpening tool, in combination with a relatively fixed bar having a longitudinal slot arranged to cross the slot first mentioned, a nut channeled to receive the said arm and allow its longitudinal adjustment and having a ribbed or corrugated inner face, a coöperating nut having a ribbed or corrugated face and arranged between the former nut and said bar and having a channel to receive the latter and permit the adjustment of this nut and attached parts longitudinally of said bar, and an adjusting bolt passing through the slots in said bar and said arm and through said nuts and operating to hold these parts together and provide for the longitudinal adjustments above indicated and for the adjustment of the angle of said arm with said bar.

2. A supporting arm provided with a longitudinal slot and carrying a disk-sharpening tool, in combination with a relatively fixed bar also longitudinally slotted, an adjusting bolt passing through both slots and devices interposed between said arm and bar and allowing the said bolt to pass through them, said devices providing for the longitudinal adjustment of said arm, and the adjustment of the angle made by said arm with said bar.

3. In combination with a supporting arm for a disk-sharpener, a split clamping sleeve having two perforated ears, a bolt passing through said ears and said arm, a spindle held rotatably by said sleeve and a sharpening wheel clamped on said spindle, the said bolt permitting the ready adjustment of said wheel into any one of divers positions of inclination for disks of either in-throw or out-throw type.

4. In combination with a curved resilient supporting arm which is adjustable longitudinally, vertically and about a pivot for varying inclination, a sharpening wheel carried by said arm and means for attaching said wheel to said arm which provide for tilting said wheel into either one of two reverse positions for grinding in-throw or out-throw disks as needed and to hold said wheel in any one of divers degrees of inclination in either position substantially as set forth.

Signed at Kagawong, Ontario, Canada, this 16th day of July 1917.

JOSEPH E. THOMPSON.

Copies of this patent may be obtained for five cents each, by addressing the "Commissioner of Patents, Washington, D. C."